(12) United States Patent
Tek et al.

(10) Patent No.: US 12,475,575 B2
(45) Date of Patent: Nov. 18, 2025

(54) CONTOUR MOTION PROPAGATION ACROSS VIEWFRAME DATA

(71) Applicant: Siemens Healthineers AG, Forchheim (DE)

(72) Inventors: Huseyin Tek, Princeton, NJ (US); Tiziano Passerini, Plainsboro, NJ (US); Ingo Schmuecking, Yardley, PA (US)

(73) Assignee: Siemens Healthineers AG, Forchheim (DE)

( * ) Notice: Subject to any disclaimer, the term of this patent is extended or adjusted under 35 U.S.C. 154(b) by 377 days.

(21) Appl. No.: 18/300,420

(22) Filed: Apr. 14, 2023

(65) Prior Publication Data

US 2024/0346665 A1 Oct. 17, 2024

(51) Int. Cl.
*G06T 7/246* (2017.01)
*G06T 7/00* (2017.01)
*G06T 7/73* (2017.01)

(52) U.S. Cl.
CPC ............. *G06T 7/248* (2017.01); *G06T 7/0016* (2013.01); *G06T 7/73* (2017.01); *G06T 2207/10016* (2013.01); *G06T 2207/20081* (2013.01); *G06T 2207/30048* (2013.01)

(58) Field of Classification Search
CPC ......... G06T 7/248; G06T 7/0016; G06T 7/73; G06T 2207/10016; G06T 2207/20081; G06T 2207/30048; G06T 2207/10132; G06T 7/246
See application file for complete search history.

(56) References Cited

U.S. PATENT DOCUMENTS

| | | | |
|---|---|---|---|
| 7,555,151 B2 | 6/2009 | Comaniciu et al. | |
| 9,972,069 B2 | 5/2018 | Tsadok et al. | |
| 10,321,892 B2 | 6/2019 | Wang et al. | |
| 10,631,828 B1 | 4/2020 | Hare, II et al. | |
| 2010/0135551 A1* | 6/2010 | Hautvast | G06T 7/0012 382/128 |
| 2012/0078097 A1* | 3/2012 | Wang | A61B 8/0883 600/437 |
| 2019/0117073 A1* | 4/2019 | Jolly | G06T 7/12 |

(Continued)

FOREIGN PATENT DOCUMENTS

EP 2434454 A2 3/2012

OTHER PUBLICATIONS

Joos et al, ("High-Frame-Rate Speckle-Tracking Echocardiography", vol. 65, No. 5, May 2018, IEEE) (Year: 2018).*

(Continued)

*Primary Examiner* — Amara Abdi (57) ABSTRACT

A system includes propagation logic configured to obtain one or more contours for one or more directed viewframes within viewframe data. The one or more contours each having a set of tracking points. The viewframe data further includes intermediate viewframes among the one or more directed viewframes. The propagation logic is configured propagate the one or more contours across the intermediate viewframes via iterative viewframe-to-viewframe propagation. The iterative viewframe-to-viewframe propagation include optical flow analysis to determine candidate locations for tracking points followed by one or more validations using motion priors and/or resolved feature tracking.

20 Claims, 3 Drawing Sheets

(56) References Cited

U.S. PATENT DOCUMENTS

| | | |
|---|---|---|
| 2021/0000449 A1 | 1/2021 | Deo et al. |
| 2024/0000430 A1* | 1/2024 | Chen ............ A61B 8/466 |

OTHER PUBLICATIONS

Ouzir et al., ("Robust Optical Flow Estimation in Cardiac Ultrasound Images Using a Sparse Representation", IEEE, vol. 38, No. 3, Mar. 2019) (Year: 2019).*

Extended European Search Report (EESR) mailed Sep. 16, 2024 in counterpart European Patent Application No. 24169429.8.

Arigovidan M et al.; "Myocardial Motion Analysis From B Mode Echocardiograms"; vol. 14; No. 4; Apr. 1, 2005; pp. 525-536.

Ouzir Nora et al.; "Robust Optical Flow Estimation in Cardiac Ultrasound Images Using a Sparse Representation"; vol. 38; No. 3; Jan. 3, 2019; pp. 741-752.

Andersen Martin V et al.; "High-Frame-Rate Deformation Imaging in Two Dimensions Using Continuous Speckle-Feature Tracking"; vol. 42; No. 11; Aug. 30, 2016.

Joos Philippe et al.; "High-Frame-Rate Speckle-Tracking Echocardiography"; vol. 65; No. 5; May 1, 2018.

Duan, Qi, et al. "Validation of optical-flow for quantification of myocardial deformations on simulated RT3D ultrasound." 2007 4th IEEE International Symposium on Biomedical Imaging: From Nano to Macro. IEEE, 2007.

Elen, An, et al. "Three-dimensional cardiac strain estimation using spatio-temporal elastic registration of ultrasound images: A feasibility study." IEEE transactions on medical imaging 27.11 (2008): 1580-1591.

Leung, KY Esther, et al. "Automatic active appearance model segmentation of 3D echocardiograms." 2010 IEEE International Symposium on Biomedical Imaging: From Nano to Macro. IEEE, 2010.

Lin Yang, Bogdan Georgescu, Yefeng Zheng, Peter Meer, and Dorin Comaniciu. "3D Ultrasound Tracking of the Left Ventricle Using One-Step Forward Prediction and Data Fusion of Collaborative Trackers." In 2008 IEEE Conference on Computer Vision and Pattern Recognition, 1-8. Anchorage, AK, USA: IEEE, 2008. https://doi.org/10.1109/CVPR.2008.4587518.

Mirea, Oana, Efstathios D. Pagourelias, Jurgen Duchenne, Jan Bogaert, James D. Thomas, Luigi P. Badano, and Jens-Uwe Voigt. "Intervendor differences in the accuracy of detecting regional functional abnormalities: a report from the EACVI-ASE strain standardization task force." JACC: Cardiovascular Imaging 11, No. 1 (2018): 25-34.

Suffoletto, Matthew S., et al. "Novel speckle-tracking radial strain from routine black-and-white echocardiographic images to quantify dyssynchrony and predict response to cardiac resynchronization therapy." Circulation 113.7 (2006): 960-968.

* cited by examiner

CONTOUR MOTION PROPAGATION ACROSS VIEWFRAME DATA

TECHNICAL FIELD

This disclosure relates to contour motion propagation across viewframe data.

BACKGROUND

Analysis of global and regional myocardium mechanics from 2D B-Mode echocardiography images is a clinically important topic with impact on patient care decisions. Specifically, global measurements such as volume, ejection fraction (EF), global longitudinal strain (GLS) are obtained by detecting cardiac boundaries at end diastolic (ED) and end systolic (ES) viewframes by AI algorithms. These AI algorithms, which are trained using a large number of expert annotated myocardium boundaries, are powerful for detecting boundaries even where viewable features of the boundary may be lacking within certain portions of the image. However, these AI-based global algorithms do not provide a correspondence between features and detected boundaries. Alternatively, local measurements such as regional strain and motion field are obtained by tracking speckles patterns using local feature tracking algorithms. These local algorithms are powerful for finding correspondences between boundary features in multiple viewframes but less successful when local speckles are not present in certain viewframes or regions due to the limitation of acquisition device.

In other systems where object motion (e.g., translation, deformation, and/or other motion) is tracked, such as the motion of robotic systems and/or biological systems, there is similar demand for algorithms that can track motion when resolved features, such as speckle patterns, are not present and maintain correspondence between features and detected contours (such as boundaries, object edges, and/or other contours).

DETAILED DESCRIPTION

A viewframe may include a viewframe of viewable image data within a series of multiple viewframes. The viewframes may be captured e.g., via an imaging pixel array, images reconstructed from captured non-image data (e.g., such as data captured in k-space from magnetic coils in magnetic resonance imaging (MRI)), interpolated images, and/or generated/simulated images which may be two-dimensional (2D) or three-dimensional (3D). In various implementations, viewframes may include images, ultrasound images (2D, 3D), sampled medical images (such as magnetic resonance imaging (MRI) (2D, 3D), computerized tomography (CT) (2D, 3D)), movie viewframes and/or other viewable viewframes. In various contexts, serial viewframe data may include a series of viewframes. In various implementations, one or more elements within the series of viewframes may be tracked across multiple viewframes.

For example, in various implementations, the motion of an object, a visible effect, or other element may be tracked across multiple viewframes. For example, an element within a viewframe may be marked using one or more contours (e.g., two-dimensional surfaces and/or lines that may be straight, curved, and/or piecewise with (straight and/or curved sections)). The tracked element may include an organ and/or an organ boundary. The motion of the organ may be tracked linearly with time and/or over cycles of motion (and/or phases of cycles of motion) of the organ. As an illustrative example for an echocardiogram, a contour mapping a boundary (e.g., such as an outline of the heart, walls of a chamber, or other heart portion) may be marked using one or more contours. The one or more contours may be tracked across the viewframes of the echocardiogram. The motion of the control may be tracked starting from an ED or ES viewframe and/or other point in the heartbeat cycle through to the end of the current phase of the heartbeat cycle, back through to the same point in the heartbeat cycle, and/or over multiple heartbeat cycles.

In conventional tracking systems, the detection and tracking process is not controlled. For example, a targeted tracking process may be implemented just after automatic element detection. For example, at a selected starting point in heartbeat cycle, such as an ED (or ES) viewframe, a conventional tracking system may autodetect (e.g., using machine vision algorithms) and mark a selected element in the serial viewframe data. The tracking algorithm may rely on speckle patterns and known information about the motion of the element to track the motion from the auto detected point. However, tracking modifies the auto detected contour from the ES (or ED) viewframe and may result in less accurate global and local measurements since tracking relies on local features instead of AI algorithms. This can be a particular problem where speckle patterns may not consistently appear in each viewframe. Thus, tracking can be lost and/or noisy across multiple viewframes. Thus, the efficacy and stability of AI algorithms using this "black-box" combined detection and tracking system may be limited. In addition, in these user opaque systems, confusion may occur when a user makes changes to contours and applies tracking afterwards. Specifically, the tracking modifies the user accepted and/or user corrected contours at target viewframes and may present different measurements based on these modifications than would have been produced if the user created/corrected contours were used to guide the tracking process (e.g., rather than just guiding the initial autodetection process).

The conventional wisdom, consistent with these conventional systems, provides that the best information for motion tracking lies solely within the current viewframe. Thus, in accord with the conventional wisdom, tracking algorithms search for the element within the current viewframe using the previous viewframe contour as a starting point for the search. Thus, the largest contribution to the ultimately assigned position of the contour in the current viewframe is the position where the speckle patterns that the tracking algorithm determines best represent the shifted contour lie in the current viewframe. As a result, user input/corrections/expectations may be lost within as little as one viewframe-to-viewframe tracking operation-particularly if there is noise present within the speckle patterns.

The architectures and techniques discussed proceed counter to the conventional wisdom by using an optical flow analysis that is validated against motion prior analysis and/or resolved feature analysis. The optical flow analysis may follow the motion of the viewframe to constrain the motion of tracking points on the contour to candidate locations corresponding to where the contour would be located based on the motion flow of the viewframe. Thus, contrary to the conventional wisdom, the contour is propagated (or reverse propagated in time) from the previous viewframe to the current viewframe rather than being "found" within the current viewframe using the previous viewframe as a starting point for the search.

Figure 1:
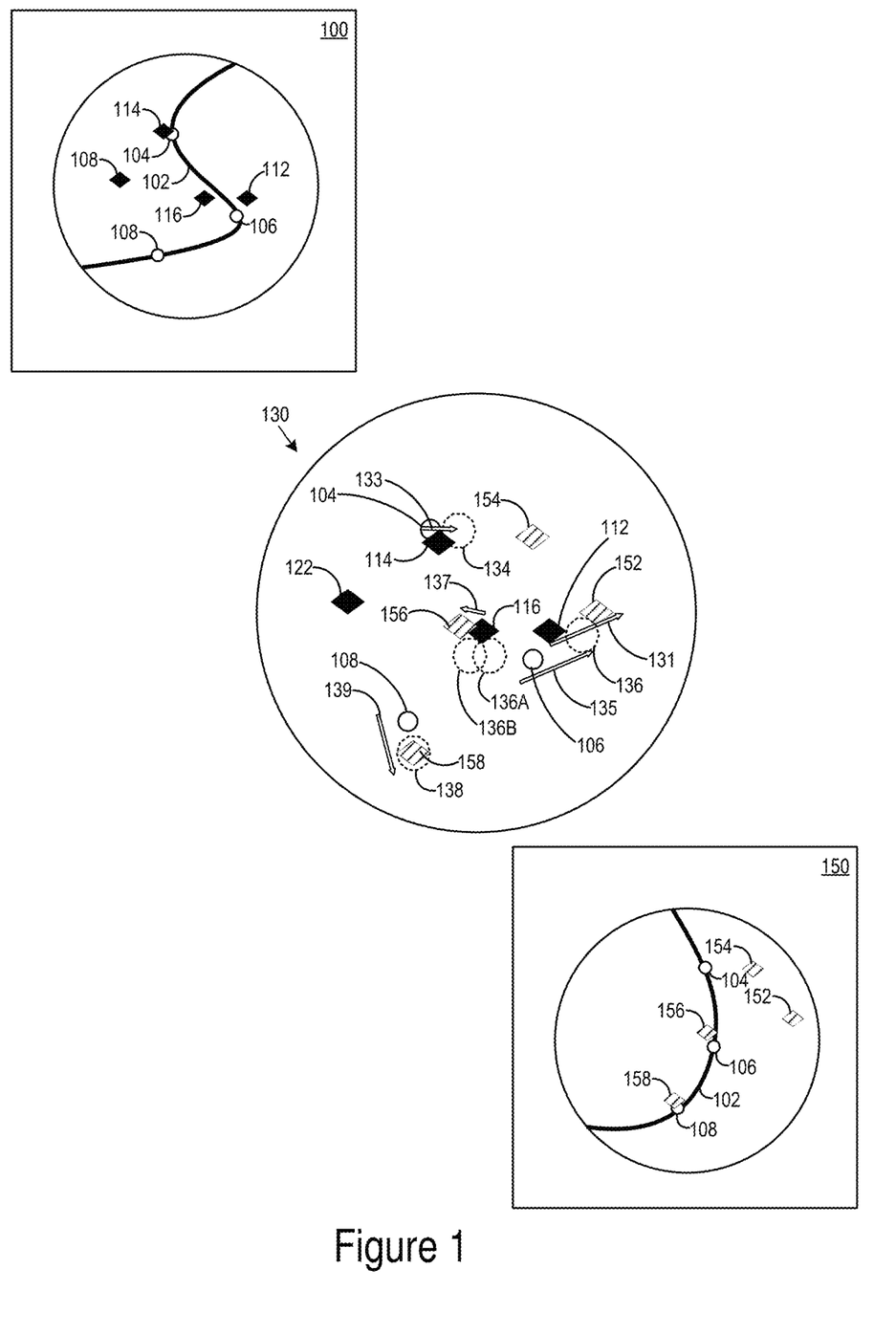
FIG. 1 shows an illustrative example tracking scenario.

FIG. 1 shows an illustrative example tracking scenario including a contour 102 marking an element within multiple viewframes 100, 150. The viewframes 100, 150 may include multiple resolved features 112, 114, 116, 122, 152, 154, 156, 158. Resolved features 112, 114, 116, in the previous viewframe 100 may correspond to resolved features 152, 154, 156 in the current viewframe. Due to noise, occlusion, obfuscation, and/or other image effects, resolved features 122, 158 may have no counterparts across the viewframes.

Tracking points 104, 106, 108 may be present on the contour 102 in both the previous viewframe 100 and the current viewframe. The previous 100 and current 150 viewframe may include virtually any pair of consecutive (e.g., in time or in reverse time) viewframes. The contour is propagated from the previous viewframe 100 to the current viewframe 150. In some cases, the previous viewframe may include a directed viewframe in which the placement of a contour and/or one or more of the contour's corresponding tracking points are determined specifically for the viewframe and not (or at least not fully) propagated from any other viewframe. In some cases, a contour and/or a tracking point may be partially propagated and then altered via directed input. Once altered or placed by directed input, the position of the contour may be fixed for that viewframe (e.g., and treated as a "ground truth" type input that, in at least some implementations, may not be altered in the propagation process). Tracking points may be adjusted along the ground truth contour positions to create correspondence to resolved features and/or correspondence relationships between sets of tracking points in different directed viewframes. Thus, contours in viewframes are propagated across one or more intermediate viewframes from directed viewframes with directed inputs.

In various implementations, The propagation process may determine the new locations of the tracking points within the current viewframe. The correspondence (e.g., one-to-one, defined group-to-one, or other correspondence) of the tracking points between the viewframes may ensure continuity between the contours. The number, spacing, and correspondence of the tracking points may be different in different implementations.

In some cases, motion of a contour may be propagated/reverse-propagated from one directed viewframe to a subsequent directed viewframe (and so on) in a linear time series. For example, for arrhythmic cardiac motion, directed contours may be made for each captured cycle to track cycle-to-cycle changes. In some cases, a contour mapping cyclic motion of an element may cycle through a set of one or more directed contours making up the cycle. For example for steady cardiac motion, a single ED directed viewframe along with a single ES directed viewframe may be used as representative of multiple cycles of motion of a tracked cardiac element. In cardiac motion scenarios, values such as global longitudinal stain (GLS) and ejection faction may be calculated based on the cardiac boundary motion.

Tracking points may be created/removed at directed viewframes. Thus, correspondence relationships between tracking points may change from directed viewframe-to-directed viewframe. Intermediate viewframes may have the same number of tracking points as the directed viewframe from which they are propagated. For transition viewframes, discussed below, the number of tracking points may be the same as that of the directed frame with the greater number of tracking points (e.g., if the two directed viewframes on which the transition viewframe is based have different numbers of tracking points).

Propagation to a particular intermediate viewframe from a directed viewframe may be done from a closest directed viewframe (e.g., having the fewest intervening viewframes between directed viewframe and the particular intermediate viewframe and/or closest in time). Because reverse-in-time propagation may be used, the closest directed viewframe may be forward in time from the particular intermediate viewframe or backward in time from the particular intermediate viewframe. In some implementations, one or more transition intermediate viewframes may be implemented. In transition intermediate viewframes, propagation transitions from propagation from a first directed viewframe to the second directed viewframe. Thus, the one or more transition intermediate viewframes may be equidistant (or roughly equidistant) from the first directed viewframe and the second directed viewframe. Various schemes may be used to effect the transition. For example, a blending scheme may be used where different weights are assigned to propagation from the respective viewframes. For example, a three transition viewframe transition between propagation from the one directed viewframe to propagation the next directed viewframe, the viewframes may progress as 100%, 75%, 50%, 25%, 0% dependent on the first directed viewframe while progressing as 0%, 25%, 50%, 75%, 100% dependent on the second viewframe. Accordingly, there will be three viewframes in a row that blend the propagation result from both the first and second viewframe. The blend may be implemented by placing a tracking point on the line between where a particular tracking point would be placed based on propagation from the first directed viewframe and where the corresponding tracking point would be placed based on propagation from the second directed viewframe. The distance from each of these placings along that line may be selected in accord with the blending weight. Thus, the corresponding tracking points are forced to converge in position over the transition viewframes. Various other linear or non-linear blending weight progressions may be used.

The particular transition scheme (e.g., blend-type, number of transition viewframes, and/or other transition scheme features) used may be selected based on the likelihood that the scheme avoids viewframe-to-viewframe discontinuities for the viewframe application. Thus, for applications that use more intermediate viewframes between two consecutive directed viewframes and/or for applications where the state of the contour between directed viewframes changes more drastically, more transition viewframes are likely to be used. However, in some cases, even a single transition viewframe may reduce viewframe-to-viewframe discontinuities even where drastic changes between consecutive directed viewframes are present.

In cases where one or more directed viewframes are used to capture the dynamics for cyclic motion, propagation from each of the directed viewframes may fan out both forward and backward in time, e.g., with transitions to the next and previous directed viewframes in the cycle. Accordingly, scenarios were a single directed viewframe is used may include transition viewframes where propagation transitions from propagation from the directed viewframe propagating forward in time to propagation from that same directed viewframe backward in time.

Optical flows 131, 133, 135, 137, 139 within the analysis-validation schematic 130 may show the optical flow from the previous viewframe to the current viewframe. Optical flow analysis may be similar to block compression in digital movie encoding. The optical flow between to viewframes may be determined based how portions of the previous viewframe can be used translated/scaled to produce portions of the current viewframe.

Candidate locations 134, 136, 138 may be determined for each of the tracking points 104, 106, 108 using the optical flows. In some implementations, multiple candidate locations may be selected for a single tracking point. From the multiple candidate locations, correlations or other comparisons may be performed to select an individual candidate location for each of the tracking points 104, 106, 108.

The determined candidate locations 134, 136, 138 may be validated based on motion priors and/or validated based on resolved features.

In various implementations, motion priors may include constraints on allowed candidate locations based on information known about the motion of the element within the viewframe. For example, the element may be known to be shrinking, expanding, moving in a particular direction, and/or following another known motion pattern. Thus, a candidate location 136 from the optical flow analysis 130 inconsistent with such constraints may be adjusted as a result of the motion prior analysis.

In various implementations, resolved features may include identifiable features within the viewframe. For example, in echocardiograms and/or other ultrasound images, a particular speckle pattern (e.g., showing a part of an organ boundary or other image content) may be a resolved feature that may be present across multiple viewframes in different locations. In some cases, a tracking point may be associated with a particular resolved feature. The candidate location may be adjusted to align with the resolved feature, e.g., when the deviation from the location determined from the optical flow and/or validated based on the motion priors would be small (e.g., within a threshold change) as a result of the adjustment. In the example of FIG. 1, the candidate locations define a particular region, the resolved feature validation is allowed to search within the particular region defined by the candidate location, 134, 136, 138. If the resolved feature is not found within the particular region defined by the candidate location, the tracking point may be adjusted to a default location (e.g. a center point, nearest neighbor interpolated point, computed contour incidence location, or other default location). However, in some implementations, candidate locations may define specific locations around which a search may occur. Then, if the resolved feature search fails, the tracking point is moved to the specifically defined location.

Figure 2:
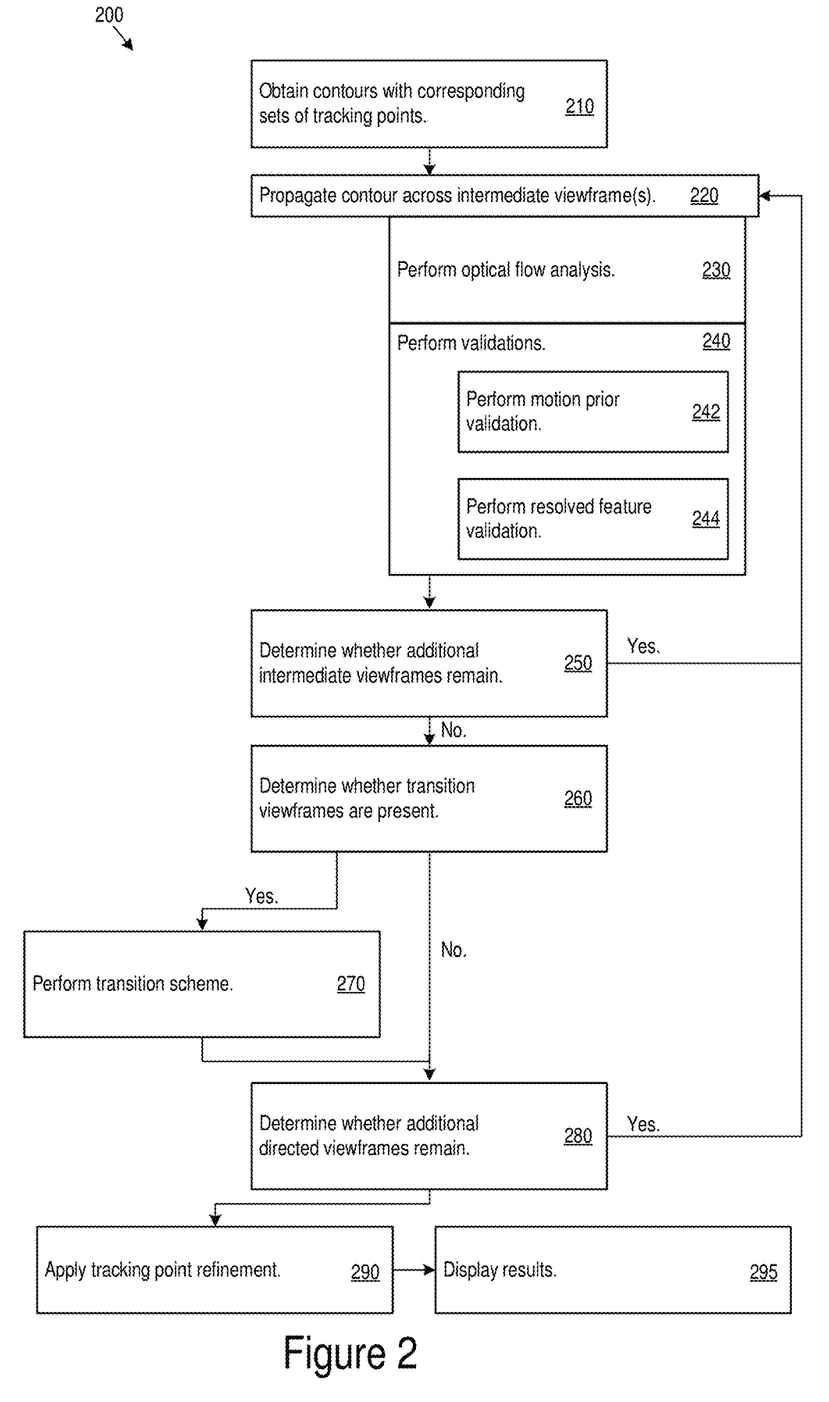
FIG. 2 shows example propagation logic.

Referring now to FIG. 2 while continuing to refer to FIG. 1, FIG. 2 shows example propagation logic (PL) 200. The PL 200 may be implemented on circuitry (e.g., as propagation circuitry). The PL 200 may be implemented to execute the propagation between previous 100 and current 150 viewframes shown in FIG. 1. The various operations of the PL 200 may be performed in varying orders. Although presented in a particular order below, various operations may be performed simultaneously or in reverse order from the order listed. For example, the order of the validations may be inverted and/or the validations may be performed simultaneously. Additionally or alternatively, various portions of the validation computations may occur simultaneously with or in advance of the optical flow analysis. Additionally or alternatively, propagation operations from different directed viewframes and/or in different directions in time from a single viewframe may be performed in parallel rather than sequentially computed.

The PL 200 may obtain, for one or more directed viewframes within viewframe data, corresponding contours along with corresponding sets of tracking points (210). The contour placements may be obtained from user input, machine-learning (neural network, image classification, feature recognition, and/or other machine learning algorithms), previously executed contour placements (e.g., that may (or may not) have been verified via user and/or machine-learning inputs). Multiple input sources may be used for the various directed viewframes (including different sources for different directed viewframes within one grouping of viewframe data).

The viewframe data, may further include intermediate viewframes interspersed among the one or more directed viewframes. The PL 200 may propagate the contour across the intermediate viewframes (220). The propagation may be sequentially and iteratively performed starting from the directed viewframes (e.g., iteratively repeating the previous viewframe 100 to current viewframe 150 cycle with directed viewframes being the "previous viewframe" for the first iteration) as discussed above. As discussed above in various implementations, the propagation by the PL 200 may be from (forward or backward in time) a closest directed viewframe.

For each previous viewframe/current viewframe iteration, the PL 200 may apply an optical flow analysis (230) to determine optical flow 131, 133, 135, 137 between the previous 100 and current 150 viewframes. The optical flows 131, 133, 135, 137 may be used to determine candidate locations 134, 136, 138 for the tracking points 104, 106, 108. In some cases, the determination of optical flow may be constrained. For example, PL 200 may constrain the optical flow such that the optical flows have: pixel value constancy (e.g., same points appear similar across the multiple viewframes—pixel values may include brightness/color values), constrained motion (points are constrained in how far they may be determined to flow from viewframe-to-viewframe), and/or spatial coherence (points may be constrained to move similarly to the movement of their neighbor points).

Various optical flow schemes may be used. For example, for images a brightness constancy constraint may be applied by the PL 200. For example, for a displacement (u, v) the over a time increment from t−1 to t, the brightness, I, may be constant. Therefore:

$$I(x, y, t-1) = I(x+u, y+v, t)$$

From this, the PL 200 may determine that:

$$\nabla I \cdot [u, v]^T + I_t = 0$$

where u and v define velocity vectors and It is the time derivative of intensities. For color data, multiple brightness constancy analyses may be performed in parallel, e.g., for the separate color channels. In some implementations, color data may be collapsed into a single brightness analysis (and/or brightness channel data alone may be used while ignoring color data).

For example, a hierarchical optical flow for tracking 2D contour points, e.g., the Gaussian pyramid representation, may be used. Tracked points may be tracked at different resolutions to allow for capture motion of the tracked element at different scales.

After determining the candidate locations using the optical flow analysis, the PL 200 may perform one or more validations (240).

In some implementations, the PL 200 may perform a motion prior validation (242). The motion prior validation may include an analysis of the candidate locations 134, 136, 138 based on a priori data on the dynamic progression of the contour. For example, the a priori data may include data on the direction of motion, average per viewframe motion, and/or other data on the motion of the contour.

For example, the PL 200 may generate trajectories for the tracking points from the contour in a first directed viewframe to the contour in a second directed viewframe. The trajectories may be divided into average per intermediate viewframe trajectories by scaling the trajectories inversely with the number of intermediate viewframes between the first and second directed viewframes. The PL 200 may compare the average trajectories to the trajectories created by the candidate locations. When a candidate location 136 diverges from the average trajectory (e.g., differing above a threshold distance value, differing in direction by more than an allowed angle, or other divergence) the candidate location 136 may be rejected/adjusted. For example, the original candidate location 136 may be rejected and updated to match the average trajectory at an altered candidate location 136A.

In some implementations, the PL 200 may perform a resolved feature validation (244). As discussed above, resolved features may include various identifiable features within a viewframe. For example, in a photographic image, an edge of a face of body or other object edge may be detected as a resolved feature. In an ultrasound image, a speckle pattern may be detected as a resolved feature.

In various implementations, a tracking point may be associated with one or more resolved features. For example, a tracking point 104 may be determined to be co-located with a particular resolved feature 114. For example, a tracking point 106 may be associated as being nearby a resolved feature 116. For example, a tracking point 108 may be associated with no resolved features in a previous viewframe 100 and be co-located with a resolved feature 158 in the current viewframe 150. Accordingly, because the PL 200 does not necessarily rely exclusively on resolved feature tracking, the relationships between tracking points 104, 106, 108 may change from viewframe-to-viewframe.

The resolved feature validation by the PL 200 may be a "soft" validation. In some implementations, a failure to find a resolved feature 154 proximate to (e.g., within a defined search range of a candidate location 134, such as from an optical flow analysis and/or an altered candidate location from a motion prior validation) may result in the candidate location 134 being accepted as a default location for the tracking point in the current viewframe 150. In other words, the absence of a previously associated resolved feature 154 may be interpreted as the resolved feature changing, disappearing, undergoing a translation above a tolerated distance, or otherwise being an unreliable guide for the location of the tracking point in the current viewframe. Thus, the candidate location 134 may remain unaltered despite the failure of the resolved feature validation.

In various implementations, because optical flow analysis and/or motion prior validation are treated as reliable indicators of macro motion viewframe-to-viewframe resolved feature validation may be constrained to be a within-tolerance correction to tracking point locations rather than a validation that may override the candidate locations resulting from other analyses/validations.

Thus, if a resolved feature 116, 156 with correspondence across the viewframes is found within a constrained search area around the candidate location 136A being validated, the candidate location 136A may be updated to an altered candidate location 136B that maintains the association with the resolved feature 116, 156 across the viewframes 100, 150.

After the tracking points have been propagated, the PL 200 check to determine whether additional intermediate viewframes remain for propagation from the particular directed viewframe serving as the origination of propagation (250).

If viewframes remain, the PL 200 may iterate the propagation process (220) with the current viewframe 150 being input into the PL 200 as the previous viewframe and the next viewframe loaded as the current viewframe.

If no viewframes remain, the PL 200 may determine whether some of the propagated viewframes are transition viewframes (260). If the propagated viewframes are transition viewframes, the PL 200 may apply the transition scheme (270) (such as, a blending scheme to combine the transition viewframes with another group of propagated viewframes). The PL 200 may determine whether additional directed viewframes remain for forward/backward propagation (280). If additional directed viewframes remain, the PL 200 may restart iterative propagation (220) with the next directed viewframe loaded as the previous viewframe.

After determining contour positions in the intermediate viewframes, the PL 200 may refine tracking point positions (290). Because the tracking points may be used for local calculations in various medical context use cases, directed-viewframe-to-directed-viewframe coherence with regard to tracking points may ensure local calculation accuracy and consistency in anatomical tracking among viewframes. In other words, consistency in anatomical tracking may be an assumption underlying the local calculations. Thus, if tracking points have inconsistent correspondence to anatomy the local calculations may be incorrect.

The PL 200 may cause a display device to display a propagated contour in accord with the assigned locations of the tracking points on the intermediate viewframes (295). The PL 200 may implement various display timings for updating the display of the tracking points. For example, in some implementations the PL 200 may update the display of the viewframes per viewframe at the time when propagation of the contour is complete for that particular intermediate viewframe. In some implementations, viewframe displays may be updated when propagation is complete for a batch of intermediate viewframes. For example, display updates may occur when propagation for a group of intermediate viewframes between two directed viewframes is complete. For example, display updates may occur when propagation for the PL 200 determines no additional directed viewframes remain for backward/forward propagation and/or when refinement of tracking point positions is complete. Various other display update timings may be used. For example, faster display update timing (e.g., closer to the first determination of a contour for a particular intermediate viewframe) may be used for implementations that prioritize update responsiveness. Slower display update timings (e.g., closer to refinement completeness) may be used for implementations that prioritize consistency of display states, e.g., to ensure data remains unchanged once first displayed. In some implementations, the propagated contours and tracking points may be stored in memory for later rendering on a display device. In various implementations, storage of the propagated contours and tracking points may occur regardless of whether display of the propagated contours occurs contemporaneously with determination of the positioning of the propagated contours by the PL 200.

To refine the tracking points, the PL 200 may apply one directional resolved feature tracking from a selected directed viewframe towards a second directed viewframe. One directional resolved feature tracking may include tracking resolved features iteratively from one directed viewframe across intermediate viewframes to a second directed viewframe. The tracking may remain one directional even across the intermediate viewframes closer to the second directed viewframe. For the tracking, the PL 200 may track resolved features with correspondence to particular tracking points. The PL 200 may reposition the tracking points along the previously propagated contour positions (determined earlier by the PL 200) based on the tracking of these corresponding resolved features across the viewframes. During tracking point refinement, the PL 200 may preserve the predetermined positioning of the contours. Accordingly, the resolved feature tracking may be constrained to tracking within the already propagated contour positions.

The application of tracking point refinement may ensure that there is consistency in resolved feature and tracking point correspondence among the viewframes (e.g., both directed and intermediate). In some cases, tracking point refinement may be applied iteratively from directed-viewframe-to-directed viewframe, such that tracking points are consistently positioned on the determined contours across the serial viewframe data as a whole.

Figure 3:
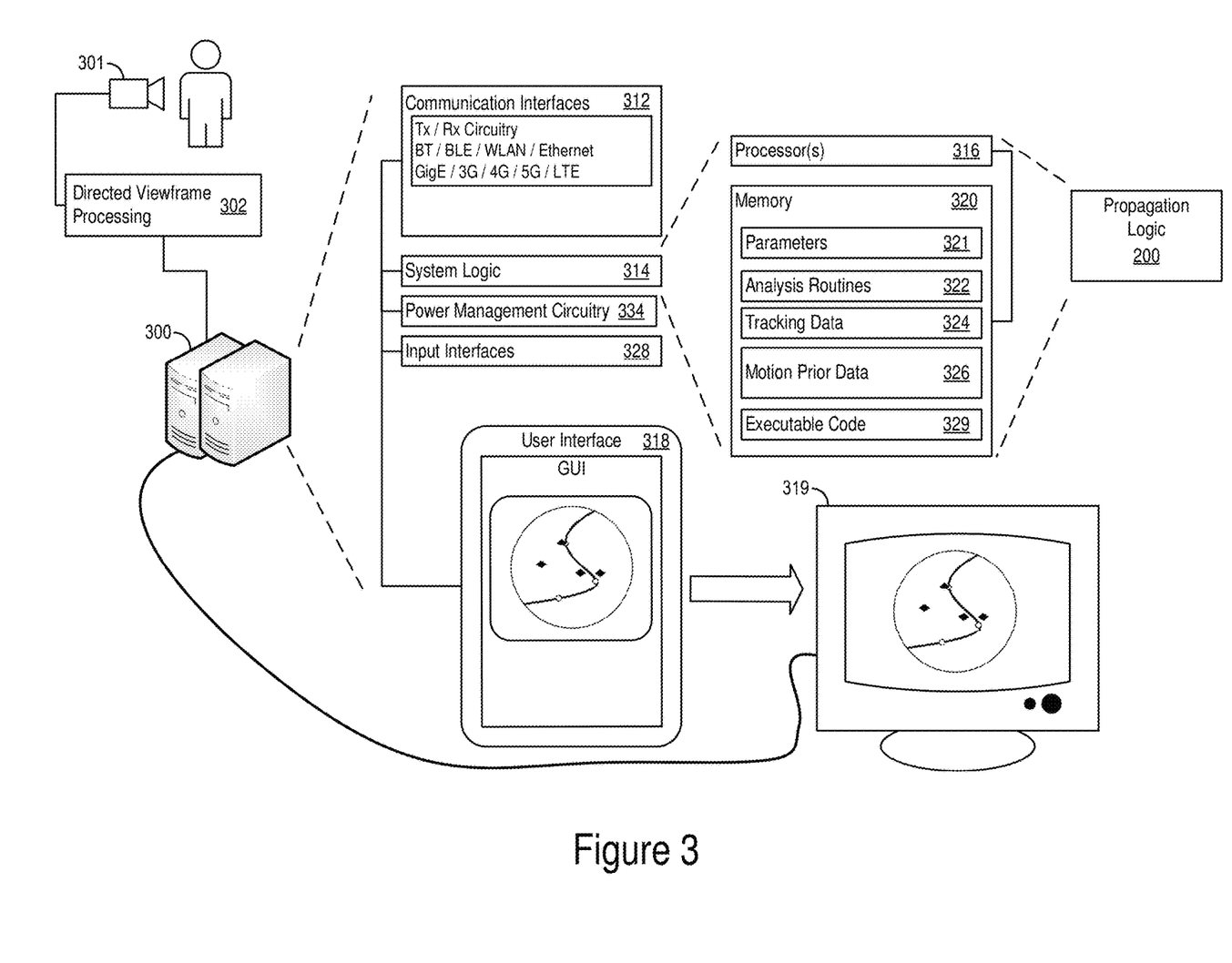
FIG. 3 shows an example propagation computation environment.

FIG. 3 shows an example propagation computation environment (PCE) 300, which, for example, may operate as propagation circuitry. The PCE 300 may include system logic 314 to support implementation of the example PL 200. The system logic 314 may include processors 316, memory 320, and/or other circuitry, which may be used to analyze optical flow, compute and/or interpret motion prior data, identify resolved features, analyze viewframe data, render contours and tracking points on onscreen interfaces, and/or iterate propagation algorithms.

The PCE 300 may receive viewframe data obtained from an imaging device 301. The viewframe data may undergo directed viewframe processing 302 to facilitate generation of fixed contours within directed viewframes prior to the propagation of the fixed contours across the intermedia viewframes. As discussed above, the directed viewframe processing 302 may include machine learning based placement of contours and/or operator input based positioning of contours. In various machine learning implementations, the generation of the directed viewframes may occur on a machine learning algorithm executing on the PCE 300. In some implementations, directed viewframe processing 302 may occur on hardware separate from the PCE 300.

The memory 320 may be used to store: analysis routines 322, tracking data 324, and/or motion prior data 326 used in execution of propagation operations. The memory 320 may further store parameters 321, such as optical flow parameters, resolved feature templates, feature associations and/or other propagation parameters. The memory may further store executable code 329, which may support propagation operation and/or other viewframe rendering functions.

The PCE 300 may also include one or more communication interfaces 312, which may support wireless, e.g. Bluetooth, Bluetooth Low Energy, Wi-Fi, WLAN, cellular (3G, 4G, 5G, LTE/A), and/or wired, ethernet, Gigabit ethernet, optical networking protocols. The PCE 300 may include power management circuitry 334 and one or more input interfaces 328.

The PCE 300 may also include a user interface 318 that may include man-machine interfaces and/or graphical user interfaces (GUI). The GUI may be used to present options for tracking point manipulation, propagation correction/alteration, and/or other control operations. The user interface 318, e.g., via the GUI, may generate a presentation of the resultant tracking points and propagated contours for display on a display device 319 such as a monitor or other display device. Presentation on the display device 319 may facilitate operator review and/or manipulation of the propagated contours and tracking points. For example, a clinician (or other operator) may view and/or manipulate propagated contours and tracking points while viewing the user interface 318 via the display device 319.

The PCE 300 may be implemented as a localized system, in some implementations. In some implementations, the PCE 300 may be implemented as a distributed system. For example, the PCE 300 may be deployed in a cloud computing environment (such as serverless and/or server-centric computing environments). In some cases, the PCE 300 may be implemented (at least in part) on hardware integrated (and/or co-located) with a user terminal.

Example Implementations

Various example implementations are described below. The example implementations are illustrative of the various general architectures described above. The various specific features of the illustrative example implementations may be readily used in other implementations with or without the various other specific features of the implementation in which they are described.

In an illustrative example system, an automated system first detects myocardium boundaries at ED and ES viewframes to create directed viewframes by using AI algorithms and then tracks these contours to the other viewframes using a multi-stage tracking algorithm. The system may also obtain "landmark" directed viewframes which may not necessarily coincide with a change in phase of the cardiac cycle, but are helpful in capturing complex cardiac motion with increased fidelity. In some cases, two directed viewframes (e.g., ES and ED viewframes) may be insufficient to capture subtle features of cardiac dynamics. In this illustrative example system, tracking algorithms do not modify the auto-detected boundaries of the directed viewframes after tracking. In addition, a user may make modifications to the contours at various times during the process. The illustrative example system does not modify the user corrected contours after successive application of the tracking algorithm for regional strains and motion field. Thus, a consistent system for automated analysis of myocardium wall from 2D echo images is provided by the illustrative example system.

The illustrative example system uses a constrained tracking algorithm that does not modify the location of boundaries at ED and ES directed viewframes as well as boundary at user corrected viewframes. Specifically, local features such as speckles at the source viewframe are propagated from source to target viewframes by combination of optical flow and speckle tracking and motion priors.

The illustrative example system initializes multiple simultaneous directed tracking methods (using optical flow, speckle tracking and motion priors) from boundaries at ED and ES, which may include user input and/or user corrected boundaries.

In the illustrative example system, multiple tracked contours are fused by using a weight function that is proportional to distances from their sources i.e., equal weights around mid-frames.

In the illustrative example system, speckle only tracking process starts from a single source such as boundary at ED viewframe or user corrected boundary and fused results are used as priors.

In the illustrative example system, the search space for speckle tracking is limited to vicinity of these prior contours and no additional motion priors are needed. At the limiting stage, the search space for speckles corresponds to the speckles on the prior contour. For the target viewframe such limiting search space is used for not modifying the boundary at the target viewframes.

In the illustrative example system, the multi-stage algorithm propagates speckle features from source directed viewframes to target directed viewframes without modifying boundaries at source and target directed viewframes. This type of constrained tracking allows for the construction of the motion field between them and eliminates motion discontinuities due to the fusion process. In addition, it allows a user to correct a boundary at any viewframe and corresponding motion field is computed without destroying existing boundaries. The system presents results consistent with user's expectation without causing confusion.

The illustrative example system may provide: automated detection and tracking system for global and regional strains; consistency between detected contours at ED and ES viewframes and tracked contours; and/or an interactive system which allows user to make corrections to the boundary location after detection (e.g., even after tracking); and/or maintenance of user corrections while local speckles are still tracked to all viewframes.

In the illustrative example system, an algorithm combines hierarchical optical flow, speckle tracking and motion priors. Specifically, a hierarchical optical flow captures motion from multi-scale myocardium edges and is used to detect an initial estimate of motion. Motion priors determine the direction of flow from the detected boundaries at the ED and ES viewframes. In addition, the motion priors for apex and annulus points are computed from the detected contours and modulate the motion for those landmarks. Speckle tracking is based on block matching patterns at the source and target location and powerful for capturing the accurate motion.

In various contexts, optical flow is used to recover image motion at each pixel from spatio-temporal image brightness variations. It is based on brightness constancy—i.e., projection of the same point looks the same in every viewframe. Specifically, when a pattern in image at time viewframe (t−1) at (x,y) location moves to another location at time (t) its intensity should stay same. The illustrative example system relies on brightness constancy (e.g., appearance consistency); constrained motion; and spatial coherence.

In the illustrative example system, hierarchical optical flow is used for tracking 2D contour points, e.g., a Gaussian pyramid representation. Specifically, contour points are tracked in different resolution to be able to capture heart motion in different scales.

In the illustrative example system, a tracked contour is used as input to the speckle tracking algorithm.

In the illustrative example system, the approximate myocardium boundaries may be automatically detected (and/or determined via user input) and represented by N control points. In an example scenario, 73 control points are used. Motion trajectories are defined as straight lines between corresponding control points at auto detected contours. These corresponding points are approximate due to the complex motion of heart. The motion priors use the direction of vectors and total displacement length at three landmarks namely two annuli and one apex location. In some cases, these landmark locations may be detected with more accuracy. Thus, more reliable displacement vectors may be determined between them. In the illustrative example system, the algorithm searches for speckles in a limited zone determined by the motion trajectories. In addition, if the detected speckle results in an estimated point trajectory with an above tolerance angle with respect to the landmark trajectories (such as more 90 degrees), it is set to "no-confidence" motion and the correct value is obtained by averaging correct motion in neighboring points. Furthermore, we propose that motion of three landmarks is modulated by the computed motion and average motion between viewframes obtained from the auto detected landmarks. The use of average motion for the landmarks makes tracking of these landmark more robust. This motion-prior guided tracking starts from the auto-detected contour at ED viewframes and refines the location of contour at the ES viewframe and allows computation global and regional strains. Similarly, a new set of motion priors are constructed between refined contour at the ES viewframe and the last viewframe in the temporal sequence, which is treated as an ED viewframe and for which the auto detected contour ED is used. Similar process may also be used between ES and ED to refine the auto-detected contour at ED.

In general, speckle tracking analyzes the motion of identifiable patterns in the images. Speckle tracking may be used for myocardium boundaries echocardiographic images. Specifically, speckle patterns in B-mode echocardiography can be automatically detected and tracked at different time scales. In the illustrative example system, speckles around the input contour points are automatically detected and local motion of contour points are determined by finding corresponding speckle patterns in neighboring viewframes. In addition, to improve accuracy and stability of the tracking algorithm, the motion obtained from optical flow is applied to input contour points moves the search starting point closer to target speckle patterns.

In various contexts, speckle regions in ultrasound images are characterized using three parameters: the coherent signal energy, the diffuse signal energy, and the number of scatters per resolution cell. In ultrasound image analysis, detection of speckle may rely on two low order moments to characterize ultrasound speckle, e.g., signal-noise ratio (SNR) and skewness(S). The above parameters are computed iteratively with different compression values to find the optimal speckle patch center and size.

In the illustrative example system, speckle tracking may use a local search which is based on cross-correlation. The tracking is computed from both boundary detection and speckle template matching using the following:

$$p(\vec{Y_t} | \vec{X_t}) = (1 - \lambda_k) p * \lambda_k | \vec{X_t}) + \lambda_k p(T_t | \vec{X_t})$$

where $T_t$ is the speckle pattern template and $\lambda_k$ is the weighting coefficient of the matching term. In the illustrative example system, $\lambda_k$ is computed based on the speckleness measure using the following:

$$fc\left(I_t(\vec{X_t}), T_t\right) = \frac{\text{cov}\left(I_t(\vec{X_t}), T_t\right)}{\sigma\left(I_t(\vec{X_t})\right)\sigma(T_t)}$$

$$\lambda_k = \frac{1}{1 + e^{-fc\left(I_t(\vec{X_t}), T_t\right)}}$$

where $\text{cov}(I_t(X_t); T_t)$ is the intensity covariance between the image block $I_t(X_t)$ centered at $X_t$ and the speckle template $T_t$. $\sigma(I_t(X_t))$ and $\sigma(T_t)$ are the intensity variance of the image block $I_t(X_t)$ and the speckle template $T_t$, respectively. To handle the temporal image variation, the speckle template $T_t$ is also updated online using the image intensities $I_t(X_t-1)$ from the previous viewframe t−1.

Combined with optical flow, speckle tracking forms the localized feature tracker in the illustrative example system. This tracker can be applied to obtain motion of endo or epicardial boundary of heart starting from an automatically detected contour. The localized feature tracking can be used to track contour segments while accepting real-time correction input data from a user. The methods, devices, processing, and logic described in the various sections above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be embodied as a signal and/or data stream and/or may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may particularly include a storage medium and instructions stored in or on the medium, and the instructions when executed by the circuitry in a device may cause the device to implement any of the processing described above or illustrated in the drawings.

The implementations may be distributed as circuitry, e.g., hardware, and/or a combination of hardware and software among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

Table 1 includes various examples.

TABLE 1

| Examples |
|---|
| 1. A method including:<br>obtaining for serial viewframe data, a first directed contour marking an element in a first directed viewframe of the serial viewframe data, a first set of tracking points being assigned to the first directed contour;<br>obtaining for the serial viewframe data, a second directed contour marking the element in a second directed viewframe of the serial viewframe data, the serial viewframe data including one or more intermediate viewframes between the first and second directed viewframes, a second set of tracking points the being assigned to the second directed contour, the second set of tracking points having a correspondence relationship to the first set; and<br>for a first intermediate viewframe of the one or more intermediate viewframes, performing contour propagation by:<br>determining a corresponding candidate location for each tracking point of the first set of tracking points by applying an optical flow analysis between a first previous viewframe and the first intermediate viewframe;<br>validating the corresponding candidate location for each tracking point of the first set using forward operation of a motion prior model, the forward operation modeling dynamic progression from the first set toward the second set;<br>validating the corresponding candidate location for each tracking point of the first set based on resolved feature tracking for the element; and<br>assigning each tracking point in the first set to the corresponding candidate location for that tracking point after performing the validations for that corresponding candidate location; and<br>displaying the first intermediate viewframe with a propagated contour positioned in accord with the assigned tracking points, where:<br>optionally, the method is in accord with any other example in this table. |

TABLE 1-continued

Examples

2. The method of any other example in this table, where the first previous viewframe includes:
the first directed viewframe; or
a previous intermediate viewframe of the one or more intermediate viewframes, the previous intermediate viewframe is between the first directed viewframe and the first intermediate viewframe within the serial viewframe data.

3. The method of any other example in this table, further including:
for a second intermediate viewframe of the one or more intermediate viewframes, further performing contour propagation by:
determining a corresponding candidate location for each tracking point of the second set of tracking points by applying the optical flow analysis between a second previous viewframe and the second intermediate viewframe;
performing a motion prior validation by validating the corresponding candidate location for each tracking point of the first set using reverse operation of the motion prior model, the reverse operation modeling dynamic progression from the second set toward the first set;
performing a resolved feature validation by validating the corresponding candidate location for each tracking point of the second set based on resolved feature tracking for the element; and
assigning each tracking point in the second set to the corresponding candidate location for that tracking point after performing the validations for that corresponding candidate location.

4. The method of example 3 or any other example in this table, where the second previous viewframe includes:
the second directed viewframe; or
a previous intermediate viewframe of the one or more intermediate viewframes, the previous intermediate viewframe is between the second directed viewframe and the second intermediate viewframe within the serial viewframe data.

5. The method of any other example in this table, where:
the serial viewframe data includes at least a third directed viewframe; and
the method further including obtaining at least a third directed contour marking the element in the third directed viewframe, the third directed contour including a third set of tracking points.

6. The method of any other example in this table, where the correspondence relationship includes a one-to-one correspondence relationship between the first and second set of tracking points.

7. The method of any other example in this table, where:
the resolved feature tracking includes speckle feature tracking within the serial viewframe data; and
at least one tracking point of the first set of tracking points is associated with a speckle feature present in the first directed viewframe.

8. The method of any other example in this table, where:
the serial viewframe data include serial medical image data; and
the element includes an organ boundary.

9. The method of example 8 or any other example in this table, where the organ boundary includes a myocardium boundary.

10. The method of any other example in this table, where the first and/or second directed viewframes correspond to selected points within one or more phases of an organ motion cycle.

11. The method of example 10 or any other example in this table, where the first directed viewframe corresponds to:
an end point of a diastolic phase of a cardiac cycle; or
an end point of a systolic phase of a cardiac cycle.

12. The method of any other example in this table, where the first and/or second set of tracking points include one or more tracking points specified via:
a machine-learning image analysis configured to determine a position of the element; and/or
operator input indicating the position of the element.

13. The method of any other example in this table, where performing the motion prior validation further include updating a position of at least one corresponding candidate location based on a deviation from at least one motion prior, the at least one motion prior including:
a direction of tracking point propagation; and/or
a vector indicating average per-viewframe motion propagation of a tracking point of the first set to a position of a tracking point of the second set.

14. The method of any other example in this table, where performing the motion prior validation further include updating a position of at least one corresponding candidate location to coincide with a detected location of a resolved feature in the first intermediate viewframe, the resolved feature associated with a tracking point of the first set.

TABLE 1-continued

Examples

15. A product including:
    machine-readable media other than a transitory signal; and
    instructions stored on the machine-readable media, the instructions configured
    to, when executed, cause a processor to:
    obtain for serial viewframe data, a first directed contour marking an
    element in a first directed viewframe of the serial viewframe data, a
    first set of tracking points being assigned to the first directed contour;
    obtain for the serial viewframe data, a second directed contour marking
    the element in a second directed viewframe of the serial viewframe
    data, the serial viewframe data including one or more intermediate
    viewframes between the first and second directed viewframes, a
    second set of tracking points the being assigned to the second
    directed contour, the second set of tracking points having a
    correspondence relationship to the first set; and
    for a first intermediate viewframe of the one or more intermediate
    viewframes, perform contour propagation by:
    determining a corresponding candidate location for each tracking
    point of the first set of tracking points by applying an optical flow
    analysis between a first previous viewframe and the first
    intermediate viewframe;
    performing a motion prior validation by validating the
    corresponding candidate location for each tracking point of the
    first set using forward operation of a motion prior model, the
    forward operation modeling dynamic progression from the first
    set toward the second set;
    performing a resolved feature validation by validating the
    corresponding candidate location for each tracking point of the
    first set based on resolved feature tracking for the element; and
    assigning each tracking point in the first set to the corresponding
    candidate location for that tracking point after performing the
    validations for that corresponding candidate location; and
    cause, on a display device, a display of the first intermediate viewframe
    with a propagated contour positioned in accord with the assigned
    tracking points, where:
    optionally, the product is in accord with any other example in this table.
16. The product any other example in this table, where the instructions are
    further configured to cause the processor to, for a second intermediate
    viewframe of the one or more intermediate viewframes, further perform
    contour propagation by:
    determining a corresponding candidate location for each tracking point
    of the second set of tracking points by applying the optical flow
    analysis between a second previous viewframe and the second
    intermediate viewframe;
    validating the corresponding candidate location for each tracking point
    of the first set using reverse operation of the motion prior model, the
    reverse operation modeling dynamic progression from the second set
    toward the first set;
    validating the corresponding candidate location for each tracking point
    of the second set based on resolved feature tracking for the element;
    and assigning each tracking point in the second set to the corresponding
    candidate location for that tracking point after performing the
    validations for that corresponding candidate location.
17. The product of any other example in this table, where:
    the serial viewframe data include serial medical image data; and
    the element includes an organ boundary.
18. The product of example 17 or any other example in this table, where the
    organ boundary includes a myocardium boundary.
19. The product of any other example in this table, where the first and/or
    second directed viewframes correspond to selected points within one or more
    phases of an organ motion cycle.
20. A system including:
    means for obtaining for serial viewframe data, a first directed contour marking
    an element in a first directed viewframe of the serial viewframe data, a first
    set of tracking points being assigned to the first directed contour;
    means for obtaining for the serial viewframe data, a second directed contour
    marking the element in a second directed viewframe of the serial viewframe
    data, the serial viewframe data including one or more intermediate
    viewframes between the first and second directed viewframes, a second set
    of tracking points the being assigned to the second directed contour, the
    second set of tracking points having a correspondence relationship to the
    first set; and
    for a first intermediate viewframe of the one or more intermediate viewframes,
    means for performing contour propagation including:
    means for determining a corresponding candidate location for each
    tracking point of the first set of tracking points by applying an optical
    flow analysis between a first previous viewframe and the first
    intermediate viewframe;

TABLE 1-continued

Examples means for validating the corresponding candidate location for each tracking point of the first set using forward operation of a motion prior model, the forward operation modeling dynamic progression from the first set toward the second set;
means for performing a motion prior validation by validating the corresponding candidate location for each tracking point of the first set based on resolved feature tracking for the element; and
means for assigning each tracking point in the first set to the corresponding candidate location for that tracking point after performing the validations for that corresponding candidate location; and
means for displaying the first intermediate viewframe with a propagated contour positioned in accord with the assigned tracking points, where: optionally, the system is in accord with any other example in this table.

21. A system including circuitry configured to implement any feature or any combination of features described in this table or disclosure.
22. A method including implementing any feature or any combination of features described in this table or disclosure.
23. A method including installing the system of any example in this table.
24. A product including:
machine-readable media; and
instructions stored on the machine-readable media, the instructions configured to cause a processor to perform (at least in part) the method of any example in this table, where:
optionally, the machine-readable media is non-transitory;
optionally, the machine-readable media is other than a transitory signal; and
optionally, the instructions are executable.
25. The method of any of the other examples in this table, where the first intermediate viewframe includes a transition intermediate viewframe; and assigning each tracking point further includes applying a transition scheme to alter the corresponding candidate location for that tracking point based on an alternate corresponding candidate location resulting from propagation from the second directed viewframe.
26. The method of any of the other examples in this table, further including performing a tracking point refinement by:
after determining contour positions for each of the one or more intermediate viewframes, applying one-directional resolved feature tracking across the one or more intermediate viewframes from the first directed viewframe to the second viewframe to adjust:
the correspondence relationship; and/or
a position of at least one tracking point along a corresponding determined contour position without adjustment of the corresponding determined contour position.

Headings and/or subheadings used herein are intended only to aid the reader with understanding described implementations. The invention is defined by the claims.

What is claimed is:

1. A method including:

obtaining, for serial viewframe data, a first directed contour marking an element in a first directed viewframe of the serial viewframe data, a first set of tracking points being assigned to the first directed contour;

obtaining for the serial viewframe data, a second directed contour marking the element in a second directed viewframe of the serial viewframe data, the serial viewframe data including one or more intermediate viewframes between the first and second directed viewframes, a second set of tracking points being assigned to the second directed contour, the second set of tracking points having a correspondence relationship to the first set; and for a first intermediate viewframe of the one or more intermediate viewframes, performing contour propagation by:

determining a corresponding candidate location for each tracking point of the first set of tracking points by applying an optical flow analysis between a first previous viewframe and the first intermediate viewframe and;

performing a motion prior validation by analyzing the corresponding candidate location for each tracking point of the first set using forward operation of a motion prior model, the forward operation modeling dynamic progression from the first set toward the second set;

performing a resolved feature validation by analyzing the corresponding candidate location for each tracking point of the first set based on resolved feature tracking for the element; and assigning each tracking point in the first set to the corresponding candidate location for that tracking point after performing the validations for that corresponding candidate location; and displaying the first intermediate viewframe with a propagated contour positioned in accord with the assigned tracking points.

2. The method of claim 1, where the first previous viewframe includes:

the first directed viewframe; or a previous intermediate viewframe of the one or more intermediate viewframes, the previous intermediate viewframe is between the first directed viewframe and the first intermediate viewframe within the serial viewframe data.

3. The method of claim 1, further including:
for a second intermediate viewframe of the one or more intermediate viewframes, further performing contour propagation by:
determining a corresponding candidate location for each tracking point of the second set of tracking points by applying the optical flow analysis between a second previous viewframe and the second intermediate viewframe;
performing the motion prior validation by analyzing the corresponding candidate location for each tracking point of the first set using reverse operation of the motion prior model, the reverse operation modeling dynamic progression from the second set toward the first set;
performing the resolved feature validation by analyzing the corresponding candidate location for each tracking point of the second set based on resolved feature tracking for the element; and
assigning each tracking point in the second set to the corresponding candidate location for that tracking point after performing the validations for that corresponding candidate location.

4. The method of claim 3, where the second previous viewframe includes:
the second directed viewframe; or
a previous intermediate viewframe of the one or more intermediate viewframes, the previous intermediate viewframe is between the second directed viewframe and the second intermediate viewframe within the serial viewframe data.

5. The method of claim 1, where:
the serial viewframe data includes at least a third directed viewframe; and
the method further including obtaining at least a third directed contour marking the element in the third directed viewframe, the third directed contour including a third set of tracking points.

6. The method of claim 1, where the correspondence relationship includes a one-to-one correspondence relationship between the first and second set of tracking points.

7. The method of claim 1, where:
the resolved feature tracking includes speckle feature tracking within the serial viewframe data; and
at least one tracking point of the first set of tracking points is associated with a speckle feature present in the first directed viewframe.

8. The method of claim 1, where:
the serial viewframe data include serial medical image data; and
the element includes an organ boundary.

9. The method of claim 8, where the organ boundary includes a cardiac boundary.

10. The method of claim 1, where the first and/or second directed viewframes correspond to selected points within one or more phases of an organ motion cycle.

11. The method of claim 10, where the first directed viewframe corresponds to:
an end point of a diastolic phase of a cardiac cycle; or
an end point of a systolic phase of a cardiac cycle.

12. The method of claim 1, where the first and/or second set of tracking points include one or more tracking points specified via:
a machine-learning image analysis configured to determine a position of the element; and/or
operator input indicating the position of the element.

13. The method of claim 1, where the first intermediate viewframe includes a transition intermediate viewframe; and
assigning each tracking point further includes applying a transition scheme to alter the corresponding candidate location for that tracking point based on an alternate corresponding candidate location resulting from propagation from the second directed viewframe.

14. The method of claim 1, further including performing a tracking point refinement by:
after determining contour positions for each of the one or more intermediate viewframes, applying one-directional resolved feature tracking across the one or more intermediate viewframes from the first directed viewframe to the second viewframe to adjust:
the correspondence relationship; and/or
a position of at least one tracking point along a corresponding determined contour position without adjustment of the corresponding determined contour position.

15. The method of claim 1, where performing the motion prior validation further include updating a position of at least one corresponding candidate location based on a deviation from at least one motion prior, the at least one motion prior including:
a direction of tracking point propagation; and/or
a vector indicating average per-viewframe motion propagation of a tracking point of the first set to a position of a tracking point of the second set.

16. The method of claim 14, where performing the motion prior validation further include updating a position of at least one corresponding candidate location to coincide with a detected location of a resolved feature in the first intermediate viewframe, the resolved feature associated with a tracking point of the first set.

17. A product including:
machine-readable media other than a transitory signal; and
instructions stored on the machine-readable media, the instructions configured to, when executed, cause a processor to:
obtain, for serial viewframe data, a first directed contour marking an element in a first directed viewframe of the serial viewframe data, a first set of tracking points being assigned to the first directed contour;
obtain, for the serial viewframe data, a second directed contour marking the element in a second directed viewframe of the serial viewframe data, the serial viewframe data including one or more intermediate viewframes between the first and second directed viewframes a second set of tracking points being assigned to the second directed contour, the second set of tracking points having a correspondence relationship to the first set; and
for a first intermediate viewframe of the one or more intermediate viewframes, perform contour propagation by:
determining a corresponding candidate location for each tracking point of the first set of tracking points by applying an optical flow analysis between a first previous viewframe and the first intermediate viewframe;
performing a motion prior validation by analyzing the corresponding candidate location for each tracking point of the first set using forward operation of a motion prior model, the forward operation modeling dynamic progression from the first set toward the second set;

performing a resolved feature validation by analyzing the corresponding candidate location for each tracking point of the first set based on resolved feature tracking for the element; and assigning each tracking point in the first set to the corresponding candidate location for that tracking point after performing the validations for that corresponding candidate location; and cause, on a display device, a display of the first intermediate viewframe with a propagated contour positioned in accord with the assigned tracking points.

18. The product of claim 17, where the instructions are further configured to cause the processor to, for a second intermediate viewframe of the one or more intermediate viewframes, further perform contour propagation by:

determining a corresponding candidate location for each tracking point of the second set of tracking points by applying the optical flow analysis between a second previous viewframe and the second intermediate viewframe;

performing the motion prior validation by analyzing the corresponding candidate location for each tracking point of the first set using reverse operation of the motion prior model, the reverse operation modeling dynamic progression from the second set toward the first set;

performing the resolved feature validation by analyzing the corresponding candidate location for each tracking point of the second set based on resolved feature tracking for the element; and assigning each tracking point in the second set to the corresponding candidate location for that tracking point after performing the validations for that corresponding candidate location.

19. The product of claim 17, where:

the serial viewframe data include serial medical image data; and the element includes a myocardium boundary.

20. A medical image analysis system including:

means for obtaining, for serial medical image viewframe data, a first directed contour marking an organ boundary in a first directed viewframe of the serial medical image viewframe data, a first set of tracking points being assigned to the first directed contour;

means for obtaining, for the serial medical image viewframe data, a second directed contour marking the organ boundary in a second directed viewframe of the serial medical image viewframe data, the serial medial image viewframe data including one or more intermediate viewframes between the first and second directed viewframes, a second set of tracking points being assigned to the second directed contour, the second set of tracking points having a correspondence relationship to the first set; and for a first intermediate viewframe of the one or more intermediate viewframes, means for performing contour propagation including:

means for determining a corresponding candidate location for each tracking point of the first set of tracking points by applying an optical flow analysis between a first previous viewframe and the first intermediate viewframe;

means for performing the motion prior validation by analyzing the corresponding candidate location for each tracking point of the first set using forward operation of a motion prior model, the forward operation modeling dynamic progression from the first set toward the second set;

means for performing a resolved feature validation by analyzing the corresponding candidate location for each tracking point of the first set based on resolved feature tracking for the organ boundary; and means for assigning each tracking point in the first set to the corresponding candidate location for that tracking point after performing the validations for that corresponding candidate location; and means for displaying the first intermediate viewframe with a propagated contour positioned in accord with the assigned tracking points.

* * * * *